(12) United States Patent
Nouchi et al.

(10) Patent No.: US 6,625,359 B1
(45) Date of Patent: Sep. 23, 2003

(54) DISPERSION-SHIFTED SINGLE-MODE OPTICAL FIBER OPTIMIZED FOR HIGH DATA RATES

(75) Inventors: Pascale Nouchi, Maisons Laffitte (FR); Jean-Claude Rousseau, Chatou (FR); Louis-Anne de Montmorillon, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/554,493

(22) PCT Filed: Sep. 17, 1999

(86) PCT No.: PCT/FR99/02222

§ 371 (c)(1),
(2), (4) Date: Jun. 15, 2000

(87) PCT Pub. No.: WO00/17683

PCT Pub. Date: Mar. 30, 2000

(30) Foreign Application Priority Data

Sep. 17, 1998 (FR) .............................................. 98 11644

(51) Int. Cl.[7] .................................................. G02B 6/16
(52) U.S. Cl. ..................... 385/123; 385/124; 385/125; 385/126; 385/127; 385/128
(58) Field of Search ................................. 385/123, 124, 385/125, 126, 127, 128

(56) References Cited

U.S. PATENT DOCUMENTS

| | | | |
|---|---|---|---|
| 5,483,612 A | | 1/1996 | Gallagher |
| 5,675,690 A | * | 10/1997 | Nouchi et al. ............... 385/127 |
| 5,684,909 A | | 11/1997 | Liu |
| 5,721,800 A | * | 2/1998 | Kato et al. .................... 385/127 |
| 5,748,824 A | * | 5/1998 | Smith ........................... 385/124 |
| 5,838,867 A | * | 11/1998 | Onishi et al. ................. 385/123 |
| 5,963,700 A | * | 10/1999 | Kato et al. .................... 385/127 |
| 5,999,679 A | * | 12/1999 | Antos et al. .................. 385/127 |
| 6,009,221 A | * | 12/1999 | Tsuda ........................... 385/123 |
| 6,009,222 A | * | 12/1999 | Dong et al. ................... 385/127 |
| 6,072,929 A | * | 6/2000 | Kato et al. .................... 385/123 |
| 6,266,467 B1 | * | 7/2001 | Kato et al. .................... 385/123 |
| 6,363,196 B1 | * | 3/2002 | Rousseau et al. ............ 385/127 |
| 6,424,775 B1 | * | 7/2002 | Paillot et al. ................. 385/123 |
| 6,424,776 B1 | * | 7/2002 | Nouchi et al. ................ 385/123 |
| 6,535,676 B1 | * | 3/2003 | de Montmorillon et al. ..... 385/123 |

FOREIGN PATENT DOCUMENTS

| | | |
|---|---|---|
| EP | 0 724 171 A2 | 7/1996 |
| EP | 0 859 247 A2 | 8/1998 |
| WO | WO 97/33188 | 9/1997 |

OTHER PUBLICATIONS

Masao Kato et al, "A new design for dispersion–shifted fiber with an effective core area larger than 100 um2 and good bending characteristics", OFC'98 Technical Digest, vol. 1, Feb. 22–27, 1998, pp. 301–302.
P. Nouchi et al "New dispersion shifted fiber with effective are larger than 90 mu m/sup/2/" Proceedings of the European Conference on Optical Communication, vol. 1, Sep. 15–19, 1996, pp. 49–52.

* cited by examiner

*Primary Examiner*—Akm Enayet Ullah
*Assistant Examiner*—Jennifer Doan
(74) *Attorney, Agent, or Firm*—Sughrue Mion, PLLC

(57) ABSTRACT

The invention relates to a dispersion-shifted single-mode optical fiber having an effective area greater than or equal to 60 $\mu m^2$. This fiber is characterized by the fact that it has a zero chromatic dispersion wavelength $\lambda_0$ that is greater than 1585 nm and chromatic dispersion at 1550 nm that is greater in absolute terms than 3 ps/nm.km. The invention is applicable to wavelength division multiplexed transmission systems, and makes it possible to limit non-linear effects, such as four-wave mixing, and to limit the use of dispersion-compensating fiber.

18 Claims, 1 Drawing Sheet

DISPERSION-SHIFTED SINGLE-MODE OPTICAL FIBER OPTIMIZED FOR HIGH DATA RATES

BACKGROUND OF THE INVENTION

The present invention relates to a dispersion-shifted single-mode optical fiber suitable for being used in wavelength division multiplexed transmission systems having high data rates.

Single-mode fibers must have characteristics that correspond to the requirements both of cable-makers and of system designers: firstly they must have good "cablability", i.e. putting the fiber in a cable must give rise to only very low additional attenuation; and secondly they must have large effective areas to avoid non-linear effects, and suitable values for the zero-dispersion wavelength $\lambda_0$.

The use of such fibers in wavelength division multiplexed transmission systems using RZ, NRZ, or soliton-type pulses involves further constraints, particularly with increasing number of transmitted channels, data rate per channel, and post-amplifier power, and with decreasing spacing between channels. It is preferable to have a fiber that has non-zero chromatic dispersion at the transmission wavelengths so as to avoid non-linear effects, and in particular four-wave mixing (FWM) in the presence of a plurality of channels. Non-zero dispersion-shifted fibers (NZ-DSFs) are therefore used that have zero chromatic dispersion wavelengths $\lambda_0$ that lie outside the ranges of the channels of the multiplexes so as to avoid the problems caused by four-wave mixing.

In addition, the use of such fibers for wavelength division multiplexed systems involves looking for a shallow chromatic dispersion gradient so as to retain propagation characteristics that are similar for the various channels.

Numerous index profiles have been proposed for such dispersion-shifted single-mode optical fibers. The index profile is generally described as a function of the appearance of the curve representing the refractive index as a function of the radius of the fiber. Conventionally, distance r to the center of the fiber is plotted along the x-axis, and index, defined by its difference relative to the index of the cladding of the fiber, is plotted up the y-axis in relative value ($\Delta n$) or in percentage ($\Delta n\% = 100 \times \Delta n/n$).

The index profile is thus said to be "stepped", "trapezium-shaped" or "triangular" for curves representing the variation of refractive index as a function of radius that are respectively stepped, trapezium-shaped, or triangular.

The article entitled "New dispersion shifted fiber with an effective area larger than 90 $\mu m^2$", Proceedings of the European Conference on Optical Communication, vol. 1, Sep. 15–19, 1996, pages 49–52, describes, inter alia, reference profiles of the "central trough" type.

The fiber profiles proposed in that article have a zero chromatic dispersion wavelength lying in the range 1572 nm to 1583 nm, with an effective area in the vicinity of 90 $\mu m^2$. Those two characteristics make it possible to satisfy the requirements in terms of non-linear effects and of four-wave mixing. However, such fibers cannot be used in high data rate tele-communications systems because, at 1550 nm, they have chromatic dispersion that is too low, and in practice lower in absolute terms that 2 ps/nm.km.

SUMMARY OF THE INVENTION

An object of the present invention is thus to develop a dispersion-shifted optical fiber that is optimized for high data rates, i.e. that has a large effective area, low losses, and a zero chromatic dispersion wavelength that is distinct from 1550 nm, making it possible to avoid the four-wave mixing phenomenon.

To this end, the present invention provides a dispersion-shifted single-mode optical fiber having an effective area greater than or equal to 60 $\mu m^2$;

characterized in that it has a zero chromatic dispersion wavelength $\lambda_0$ that is greater than 1585 nm and chromatic dispersion at 1550 nm that is greater in absolute terms than 3 ps/nm.km.

The fiber of the invention is a dispersion-shifted single-mode fiber having a large effective area, as well as chromatic dispersion that, for the wavelengths situated in the transmission window around 1550 nm, is both low enough not to give rise to information losses during transmission, and also high enough to avoid the four-wave mixing phenomenon over the entire transmission window. In addition, the chromatic dispersion gradient of the fiber of the invention is shallow.

Advantageously, the fiber is single-mode in fiber.

For high data rate systems, it is also useful for the fiber to provide single-mode propagation of the channels of the multiplex. ITU-T G 650 gives a definition of the cutoff wavelength in cable. The theoretical cutoff wavelength of the fiber is generally greater by several hundred nanometers than the cutoff wavelength in cable. The propagation in an optical fiber can be single-mode even if the theoretical cutoff wavelength is greater than the wavelength of the signals used: beyond a distance of a few meters or a few tens of meters, which is short compared with the propagation distances in optical-fiber transmission systems, the secondary modes disappear because of attenuation that is too great. The propagation in the transmission system is then single-mode.

In addition, the bending losses of the fiber of the invention are less than 0.05 dB at 1550 nm for a winding of 100 turns of the fiber around a radius of 30 mm.

Advantageously, the fiber has chromatic dispersion lying, in absolute terms, in the range 3 ps/nm.km to 6 ps/nm.km for a wavelength of 1550 nm.

The fiber has a chromatic dispersion gradient lying, in absolute terms, in the range 0.045 ps/nm$^2$.km to 0.09 ps/nm$^2$.km, and preferably in the range 0.045 ps/nm$^2$.km to 0.075 ps/nm$^2$.km for wavelengths of 1550 nm. These values for the chromatic dispersion gradient guarantee, in the range in which the fiber is used, that the chromatic dispersion remains substantially constant. The fiber is thus suitable for use under wavelength division multiplexing, and has chromatic dispersion values that are substantially equal over the band of the multiplex.

Preferably, the attenuation of the fiber is less than or equal to 0.23 dB/km at 1550 nm. Such an attenuation value guarantees that transmission losses are limited.

In a first embodiment of the invention, the fiber has an index profile comprising a central portion of index $n_i$ less than the index $n_s$ of the cladding of the fiber, an inner ring of index $n_2$ greater than the index of the cladding and extending around said central portion, an outer ring of index $n_4$ greater than the index of the cladding and extending around said inner ring, and, between said inner ring and said outer ring, an annular portion of index $n_3$ less than or equal to the indices of said inner ring and of said outer ring.

In which case, the difference $\Delta n_1$ between the index of the central portion of the fiber and the index of the cladding preferably lies within a range of $-6.5 \times 10^{-3} \pm 10\%$.

The radius $a_1$ of the central portion of the fiber advantageously lies within a range of 2.1 µm±10%.

In an embodiment, the difference $\Delta n_2$ between the index of the inner ring of the fiber and the index of the cladding lies within a range of $12.0 \times 10^{-3} \pm 10\%$.

It is possible to make provision for the ratio $a_1/a_2$ between the radius $a_1$ of the central portion of the fiber and the radius $a_2$ of the inner ring to lie within a range of 0.50±10%.

In another embodiment, the difference $\Delta n_3$ between the index of the annular portion and the index of the cladding lies within a range of $-6.5 \times 10^{-3} \pm 10\%$.

In addition, the thickness $a_3-a_2$ of the annular portion advantageously lies within a range of 2.1 µm±10%.

Preferably, the difference $\Delta n_4$ between the index of the outer ring and the index of the cladding lies within a range of $3.5 \times 10^{-3} \pm 10\%$.

In addition, the thickness $a_4-a_3$ of the outer ring lies within a range of 2.1 µm±10%.

In a second embodiment of the invention, the fiber has an index profile comprising a central portion of maximum index $n_1$ greater than the index $n_s$ of the optical cladding, a ring of maximum index $n_4$ greater than the index of the optical cladding and surrounding said central portion, and an intermediate zone of index $n_2$ less than $n_1$, and less than $n_4$, between said central portion and said ring.

In a preferred implementation of the second embodiment, the difference $\Delta n_1$ between $n_1$ and $n_s$ lies in the range $9 \times 10^{-3}$ to $17 \times 10^{-3}$.

The difference $\Delta n_4$ between $n_4$ and $n_s$ is less than $12 \times 10^{-3}$.

BRIEF DESCRIPTION OF THE DRAWING

Other characteristics and advantages of the invention will appear on reading the following description of embodiments of the invention given by way of example and with reference to the figures, in which.

DETAILED DESCRIPTION OF THE INVENTION

The invention proposes a dispersion-shifted single-mode optical fiber having a large effective area, typically larger than 60 µm², or even larger than 70 µm², low bending losses, and a zero dispersion wavelength $\lambda_0$ that is greater than 1585 nm.

Advantageously, the cutoff wavelength $\lambda_c$ is chosen such that the fiber of the invention is single-mode in theory, or at least single-mode in fiber, i.e. in the definition given in ITU-T G 650 of the fiber $\lambda_c$.

If, in addition, provision is made for the sensitivity to microbending to be less than or comparable with that of the fiber sold under reference G652 by the Applicant, then the fiber is guaranteed to have good cablability. Its cablability is particularly good if the attenuation caused by bending as measured conventionally over 100 turns of a fiber wound on a reel having a radius of 30 mm is less than 0.5 dB, as proposed in Recommendation ITU-T G.650, or, even better, less than 0.05 dB.

Figure 1:
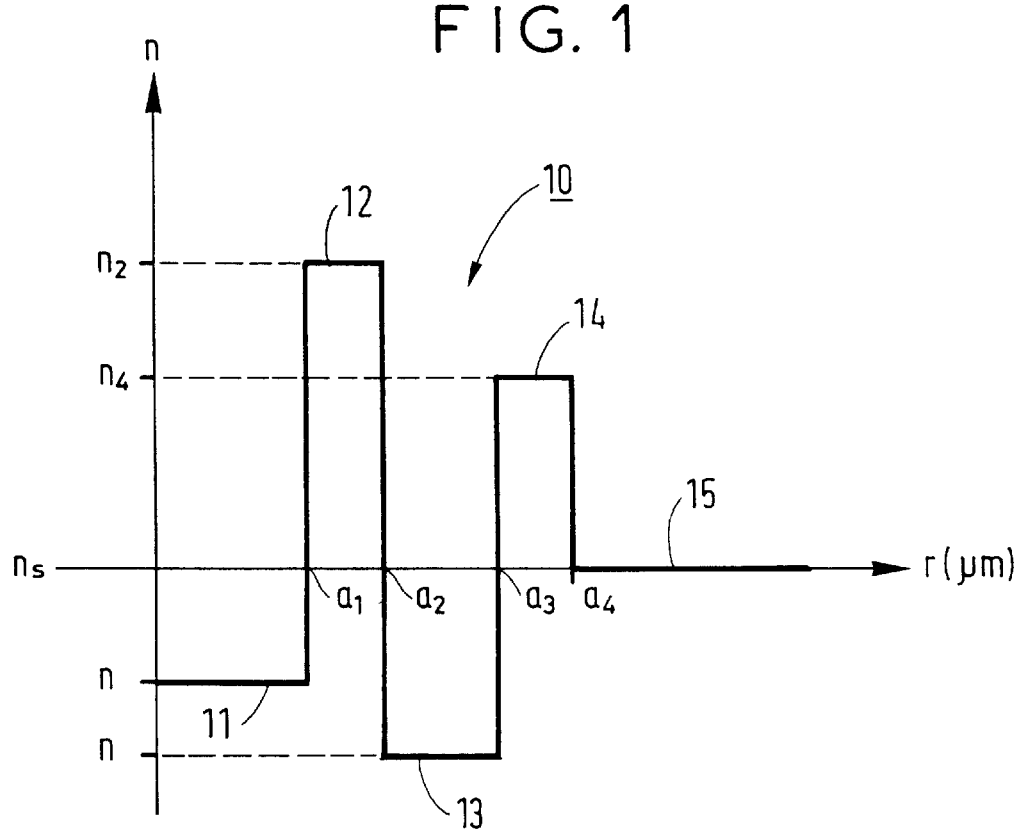
FIG. 1 is a diagram showing the index profile of a first embodiment of a fiber of the invention.

FIG. 1 shows a diagram of an index profile 10 which can be used to obtain the characteristics of the invention, in a first embodiment. The index profile shown in FIG. 1 is an index profile having a central trough with an outer ring. Starting from the center of the fiber and going towards the cladding, the profile has a central portion 11 of substantially constant index to a radius $a_1$. The index $n_1$ of this central portion is less than or equal to the index $n_s$ of the silica of the cladding represented by the portion 15 of the profile 10.

In the embodiment shown in FIG. 1, the difference $\Delta n_1$ between the index $n_1$ and the index $n_s$ of the cladding is equal to $-6.5 \times 10^{-3}$, and the radius $a_1$ is equal to 2.1 µm. Index values $\Delta n_1$ in a range of ±10% around said value are appropriate; the value of the radius $a_1$ may vary without any problem by ±10% about the proposed value.

Around the central portion 11 of index lower than that of the cladding 15, the fiber of the invention has an inner ring 12 of index $n_2$ greater than the index of the cladding, from radius $a_1$ to radius $a_2$. In the embodiment shown in FIG. 1, $\Delta n_2$ is equal to $12 \times 10^{-3}$, and the inner ring 12 extends over a thickness of 2.1 µm. More generally, values for $\Delta n_2$ lying in a range of ±10% around said value are suitable, and the thickness of the inner ring 12 is preferably such that the ratio $a_1/a_2$ can vary by ±10% relative to the reference value of 2.1/4.2=0.5 proposed in the example.

Around the inner ring 12, the fiber has an outer ring 14 of index $n_4$ greater than that of the cladding 15, which ring is separated from the inner ring 12 by an annular portion of index $n_3$ less than or equal to the index of the cladding 15. In the embodiment shown in FIG. 1, the annular portion 13 has an index $\Delta n_3$ of $-6.5 \times 10^{-3}$ from radius $a_2$ to radius $a_3$. As in this example, the index $\Delta n_3$ of the annular portion 13 of the fiber of the invention is preferably less than or equal to the index $\Delta n_1$ of the central portion 11 of the fiber. Advantageously, it varies over a range of ±10% around the value $-6.5 \times 10^{-3}$ proposed in the example of the figure. The thickness $a_3-a_2$ between the inner ring 12 and the outer ring 14 is preferably about 2.1 µm; variations in a range of ±5% are acceptable.

In the example shown in FIG. 1, the outer ring 14 has an index $\Delta n_4$ of $3.5 \times 10^{-3}$; values within a range of ±10% around this index are suitable. The thickness $a_4-a_3$ of the outer ring 14 preferably lies within a range of ±10% around the value of 2.1 µm given in the example of the figure.

Within the range of the channels of a wavelength multiplex, i.e. typically in the range 1500 nm to 1600 nm, this choice of index profile guarantees a large effective area, a shallow chromatic dispersion gradient and a chromatic dispersion that makes it possible to avoid four-wave mixing; it is thus possible to reduce the distance between repeaters in a transmission system that uses the optical fiber of the invention as the transmission medium, and to reduce the problem of chromatic dispersion compensation.

In the example of FIG. 1, the effective area is 85 µm² at 1550 nm, and 79 µm² at 1480 nm, the dispersion gradient is 0.069 ps/nm².km, at 1550 nm. The chromatic dispersion is equal to $-4.4$ ps/nm.km at 1550 nm. It is zero for a value of 1615 nm.

The attenuation in the fiber is about 0.23 dB/km. This value makes it possible to transmit over long lengths, and typically guarantees a length of 100 km between the repeaters of a transmission system.

With the index profile of FIG. 1, it is also possible to obtain bending losses of less than $10^{-5}$ dB for 100 turns of fiber about a reel having a radius of 30 mm, i.e. values of about $10^{-7}$ dB/m. for wavelengths in the vicinity of 1550 nm. The sensitivity to microbending is half that of the above-mentioned fiber G652, for wavelengths in the vicinity of 1550 nm.

The fiber of FIG. 1 can be manufactured by the person skilled in the art by means of known techniques, such as modified chemical vapor deposition (MCVD) or other techniques commonly used to manufacture optical fibers.

This profile makes it possible to obtain the characteristics indicated in Table 1.

Table 1 gives the theoretical cutoff wavelength $\lambda_c$ in nm, the zero chromatic dispersion wavelength $\lambda_0$ in nm, the dispersion gradient at 1550 nm dC/d$\lambda$ in ps/nm².km, the chromatic dispersion at 1550 nm DC in ps/nm.km, the mode diameter $W_{02}$ at 1550 nm in $\mu$m, the effective area $A_{eff}$ at 1550 nm in $\mu$m², the sensitivity to bending $S_c$ (i.e. bending losses) for 100 turns on a radius of 30 mm in dB, and the sensitivity to microbending at 1550 nm $S\mu_c$. This sensitivity to microbending is given in proportion to that of the above-mentioned fiber G 652.

TABLE 1

| $\lambda_C$ (nm) | $\lambda_0$ (nm) | dC/d$\lambda$ | DC | $W_{02}$ | $A_{eff}$ | $S_c$ | $S\mu_C$ |
|---|---|---|---|---|---|---|---|
| 1620 | 1615 | 0.069 | −4.4 | 3.83 | 85 | <10⁻⁵ | 0.75 |

The values in Table 1 show that the profiles described with reference to FIG. 1 make it possible to obtain the characteristics of the invention.

The profile of FIG. 1 constitutes an example making it possible to implement the invention. Other profiles may make it possible to reach the gradient and dispersion values proposed in the invention.

Figure 2:
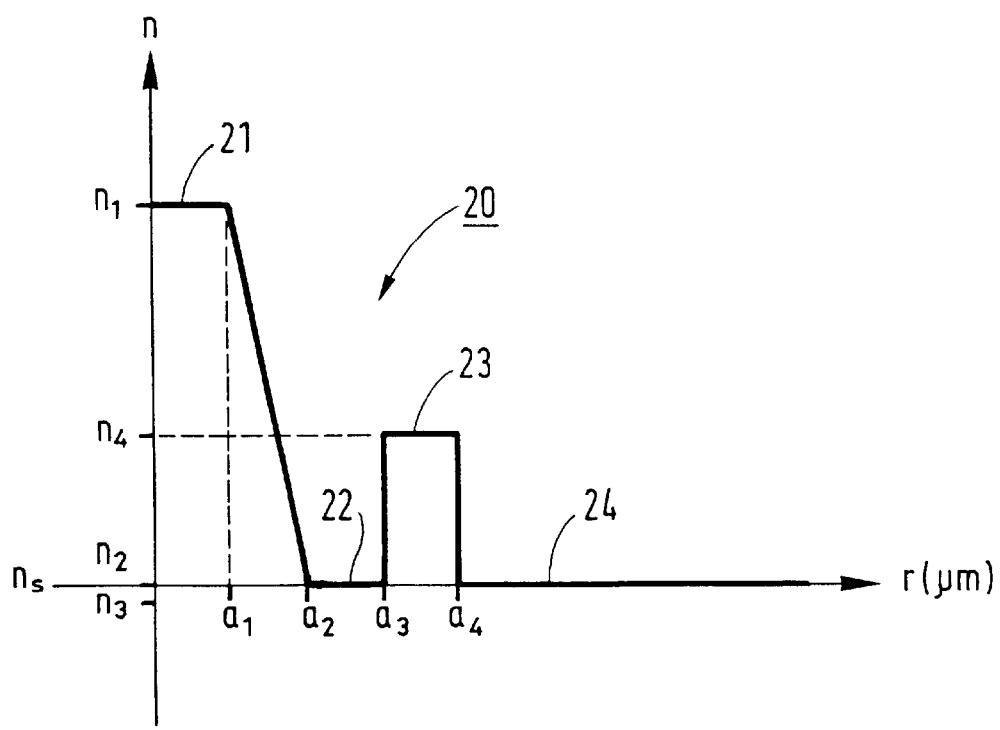
FIG. 2 is a diagram showing the index profile of a second embodiment of a fiber of the invention.

FIG. 2 is a diagram showing an index profile 20 which can be used to obtain the characteristics of the invention, in a second embodiment. The index profile of FIG. 2 is an index profile of the "trapezium-and-ring" type. Starting from the center of the fiber and going towards the cladding, this profile has a central portion 21 in the form of a trapezium of small radius $a_1$ and of large radius $a_2$. The maximum index $n_1$ of this central portion 21 is greater than or equal to the index $n_s$ of the silica of the cladding represented by the portion 24 of the profile 20.

Around said central portion 21 of index $n_2$ greater than that of the cladding 24, the fiber of the invention has a ring 23 of index $n_3$ greater than that of the cladding, and less than $n_1$, from radius $a_3$ to radius $a_4$.

Between the central portion 21 and the ring 23, the fiber has an annular portion 22 of index $n_2$ less than $n_1$ and less than $n_3$.

The type of profile shown in FIG. 2 offers the same advantages as that shown in FIG. 1.

The fiber shown in FIG. 2 can be manufactured by the person skilled in the art by means of known techniques, such as MCVD or other techniques in common use for manufacturing optical fibers.

By way of examples, possible parameters are given below for the profile of FIG. 2 making it possible to obtain a fiber of the invention, as are the values of the characteristics obtained.

Table 2 gives the possible radius and index values for the profiles. The radii are given in micrometers, and the indices are given (in relative value) in $\Delta n$. Each row of the table corresponds to a possible profile.

TABLE 2

| $a_1$ ($\mu$m) | $a_2$ ($\mu$m) | $a_3$ ($\mu$m) | $a_4$ ($\mu$m) | $10^3 \cdot \Delta n_1$ | $10^3 \cdot \Delta n_3$ | $10^3 \cdot \Delta n_4$ |
|---|---|---|---|---|---|---|
| 0.86 | 2.87 | 5.39 | 7.18 | 12.38 | 0 | 4.95 |
| 0.94 | 3.14 | 5.50 | 7.86 | 11.24 | 0 | 3.6 |

The various profiles make it possible to obtain the characteristics indicated in Table 3 on the corresponding rows (same headings as in Table 1).

TABLE 3

| $\lambda_C$ (nm) | $\lambda_0$ (nm) | dC/d$\lambda$ | DC | $W_{02}$ | $A_{eff}$ | $S_c$ | $S\mu_C$ |
|---|---|---|---|---|---|---|---|
| 1702 | 1606 | 0.111 | −6.2 | 8.78 | 61 | 1.1 × 10⁻⁶ | 0.76 |
| 1707 | 1594 | 0.096 | −4.1 | 8.86 | 60.5 | 2.1 × 10⁻⁶ | 0.8 |

The values of Table 3 show that the profiles defined in Table 2 make it possible to obtain the characteristics of the invention.

Naturally, the present invention is not limited to the embodiments described and shown, but rather numerous variants of it are accessible to the person skilled in the art. In particular it is possible to obtain the characteristics of the invention with families of profiles other than those described with reference to FIGS. 1 and 2.

What is claimed is:

1. A dispersion-shifted single-mode optical fiber having an effective area greater than or equal to 60 $\mu$m²;
   characterized in that it has a zero chromatic dispersion wavelength $\lambda_0$ that is greater than 1585 nm, chromatic dispersion at 1550 nm that is greater in absolute terms than 3 ps/nm.km, a chromatic dispersion gradient at 1550 nm lying, in absolute terms, in the range 0.045 ps/nm².km to 0.09 ps/nm².km.

2. A fiber according to claim 1, characterized in that it is single-mode in fiber.

3. A fiber according to claim 1, characterized in that it has bending losses of less than 0.05 dB at 1550 nm for a winding of 100 turns of the fiber around a radius of 30 mm.

4. A fiber according to claim 1, characterized in that it has chromatic dispersion lying, in absolute terms, in the range 3 ps/nm.km to 6 ps/nm.km for a wavelength of 1550 nm.

5. A fiber according to claim 1, characterized in that it has a chromatic dispersion gradient lying, in absolute terms, in the range 0.045 ps/nm².km to 0.075 ps/nm².km for a wavelength of 1550 nm.

6. A fiber according to claims 1, characterized in that it has attenuation of less than or equal to 0.23 dB/km at 1550 nm.

7. A fiber according to claim 1, characterized in that it has an index profile comprising a central portion (11) of index $n_1$ less than the index $n_s$ of the cladding (15) of the fiber, an inner ring (12) of index $n_2$ greater than the index of the cladding (15) and extending around said central portion (11), an outer ring (14) of index $n_4$ greater than the index of the cladding (15) and extending around said inner ring (12), and between -said outer ring (14), an annular portion (13) of index $n_3$ greater than the indices of said inner ring (12) and of said outer ring (14).

8. A fiber according to claim 7, characterized in that the difference between the index of the central portion (11) of the fiber and the index of the cladding (15) lies within a range of −6.5×10⁻³±10%.

9. A fiber according to claim 7, characterized in that the radius $a_1$ of the central portion (11) of the fiber lies within a range of 2.1 $\mu$m±10%.

10. A fiber according to claim 7, characterized in that the difference between the index of the inner ring (12) of the fiber and the index of the cladding (15) lies within a range of $12 \times 10^{-3} \pm 10\%$.

11. A fiber according to claim 7, characterized in that the ratio between the radius of the central portion (11) of the fiber and the radius of the inner ring (12) lies within a range of $0.5 \pm 10\%$.

12. A fiber according to claim 7, characterized in that the difference between the index of the annular portion (13) and the index of the cladding lies within a range of $-6.5 \times 10^{-3} \pm 10\%$.

13. A fiber according to claim 7, characterized in that the thickness of the annular portion (13) lies within a range of $2.1\ \mu m \pm 10\%$.

14. A fiber according to claim 7, characterized in that the difference between the index of the outer ring (14) and the index of the cladding (15) lies within a range of $3.5 \times 10^{-3} \pm 10\%$.

15. A fiber according to claim 7, characterized in that the thickness of the outer ring (14) lies within a range of $2.1\ \mu m \pm 10\%$.

16. A fiber according to claim 1, characterized in that it has an index profile comprising a central portion (21) of maximum index $n_1$ greater than the index $n_s$ of the optical cladding (24), a ring (23) of maximum index $n_4$ greater than the index of the optical cladding (24) and surrounding said central portion (21), and an intermediate zone (22) of index $n_2$ less than $n_1$, and less than $n_4$, between said central portion (21) and said ring (23).

17. A fiber according to claim 16, characterized in that the difference between the index of the central portion (21) and the index of the cladding (24) lies in the range $9 \times 10^{-3}$ to $17 \times 10^{-3}$.

18. A fiber according to claim 16, characterized in that the difference between the index of the ring (23) and the index of the cladding (24) is less than $12 \times 10^{-3}$.

* * * * *